(No Model.)  N. O. HENDERSON.  3 Sheets—Sheet 1.
HAY LOADER.
No. 515,773.  Patented Mar. 6, 1894.
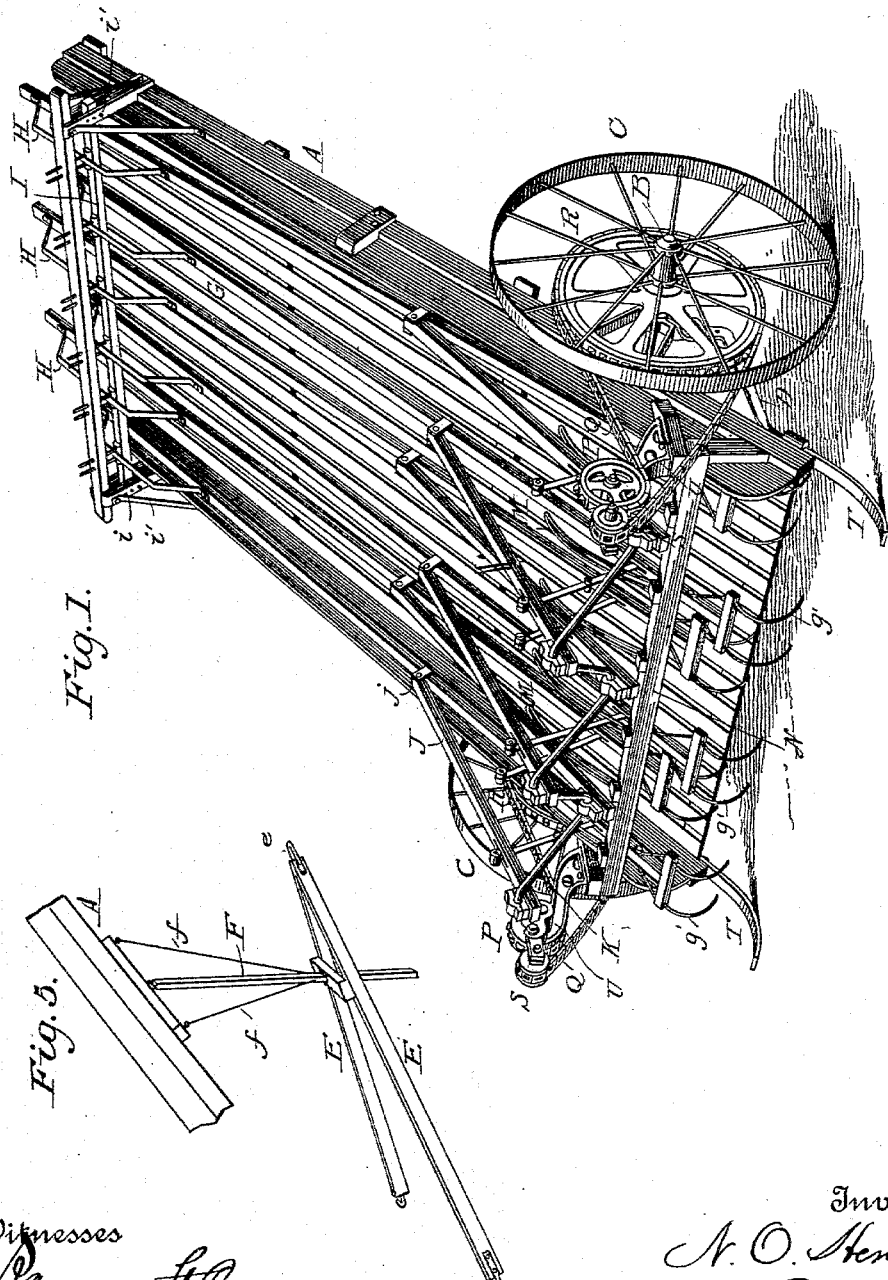
Witnesses
Raymond F. Barnes
Inventor
N. O. Henderson
By P. T. Dodge
Attorney

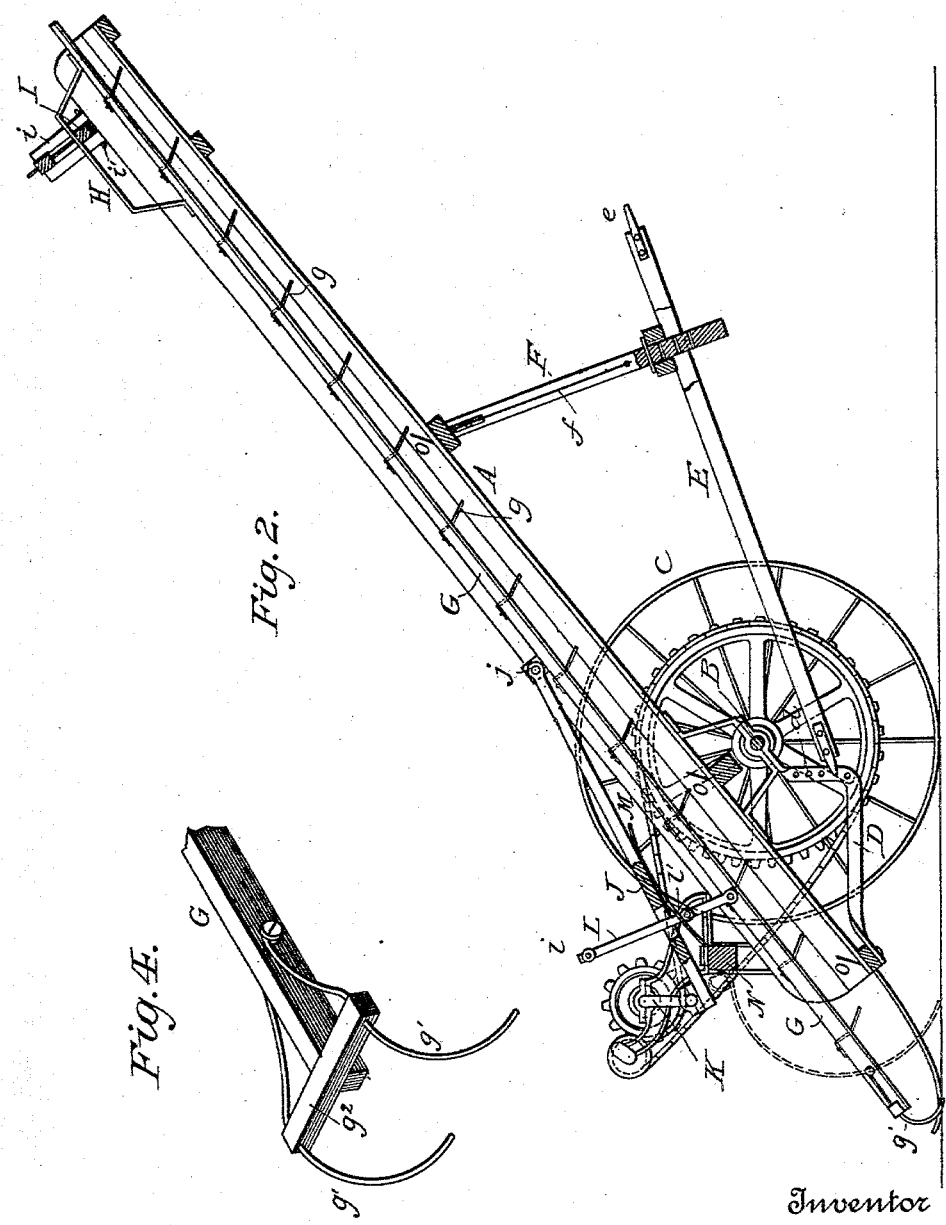

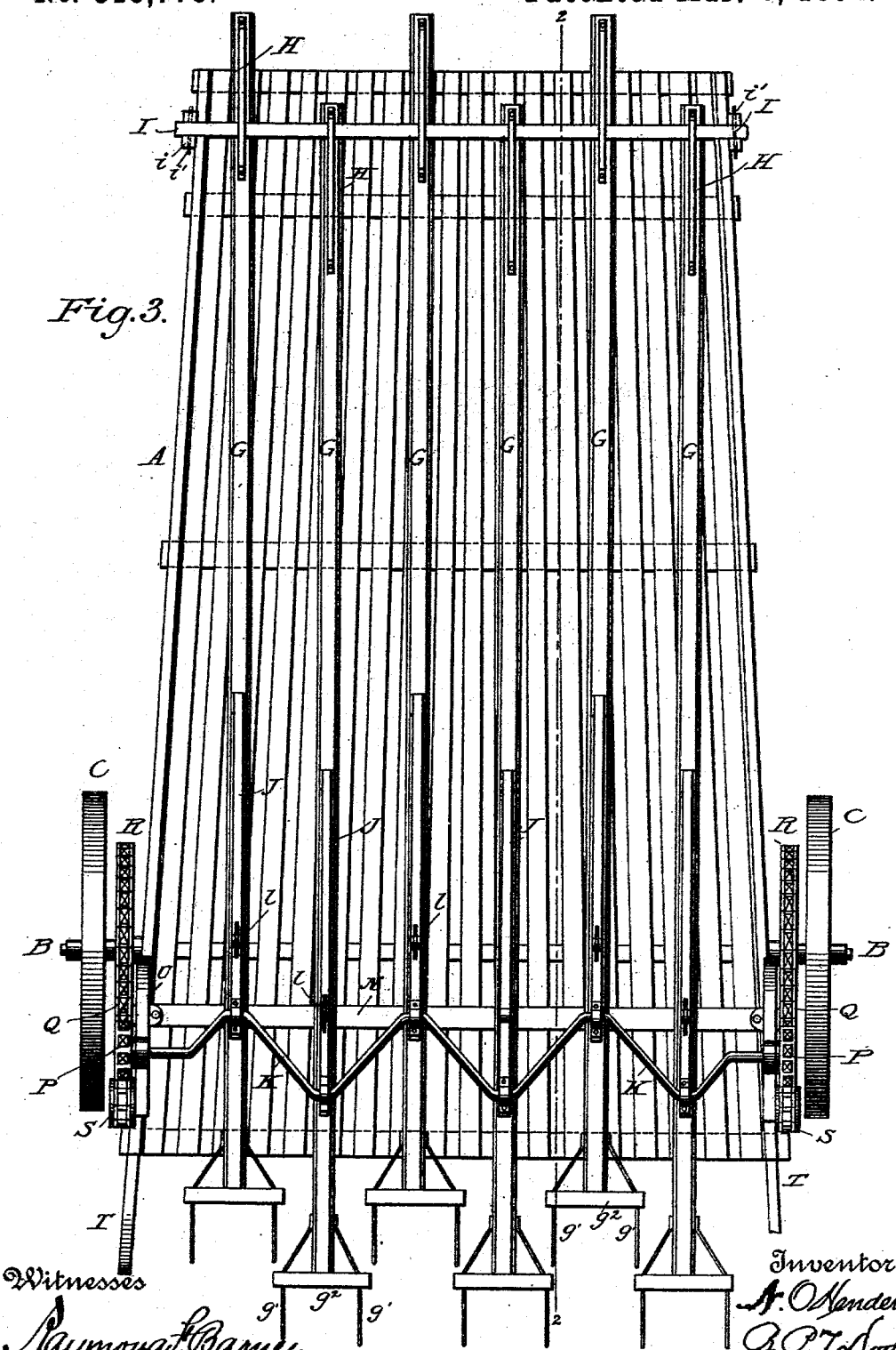

UNITED STATES PATENT OFFICE.

NORMAN O. HENDERSON, OF DAVENPORT, IOWA, ASSIGNOR TO THE EAGLE MANUFACTURING COMPANY, OF SAME PLACE.

HAY-LOADER.

SPECIFICATION forming part of Letters Patent No. 515,773, dated March 6, 1894.

Application filed June 16, 1892. Serial No. 436,976. (No model.)

*To all whom it may concern:*

Be it known that I, NORMAN O. HENDERSON, of Davenport, county of Scott, and State of Iowa, have invented a new and useful Improvement in Hay-Loaders, of which the following is a specification.

This invention relates to that class of hay loaders which consist of an inclined wheeled frame and a series of toothed longitudinally reciprocating rake bars driven from the wheels through intermediate gearing in such manner as to pick up the hay from the ground and carry the same upward over the frame to the wagon or other receptacle with which the loader is carried through the field.

The invention has reference to various improvements in the construction of the frame or rake bars and their driving mechanism, having in view more particularly a simplicity of construction, ease of action and the ability to handle a large quantity of hay without danger of choking the rakes or impeding their action.

In the accompanying drawings, Figure 1, is a perspective view of the machine complete. Fig. 2, is a vertical section through the machine from front to rear on the line 2—2 of Fig. 3. Fig. 3 is a top plan view of the machine. Fig. 4 is a perspective view of the lower end of one of the rake-bars, showing the gathering teeth. Fig. 5 is a perspective detail showing tongue and brace rods.

Referring to the drawings A represents an inclined elevator frame which may be of any suitable construction, adapted to admit of the hay being carried over its upper surface from the lower to the upper end. It is preferably constructed as shown of a series of longitudinal slats connected by cross bars with two raised boards or ledges along the sides, the construction in this regard being essentially the same as in other machines and forming no part of the present invention.

The frame A is mounted near its lower end rigidly on a transverse axle B, sustained at its ends by bracket journals mounted in two large ground wheels C. To the under side of the frame on each side near the lower end is secured an angular draft arm D, the forward upright ends of which are provided with a series of holes $d$, at different heights. Through these holes are engaged hooks on the rear ends of two draft bars E, which are extended forward and jointed at their front ends by a hook or coupling $e$ intended for connection with the rear end of the wagon or other receptacle for the hay, so that the loader may be drawn behind the same. For the purpose of maintaining the upper end of the frame at the required elevation and to permit its vertical adjustment, an upright bar is hinged at its upper end to the under side of the frame A, and extended at its lower end downward through the cross piece on the draft bars E, the bar being provided with a series of transverse holes to receive pins by which its up and down motion may be controlled as desired. Inclined brace rods $f$ extend from the sides of the elevator frame downward to the bar F in order to stiffen the structure and prevent the frame from tipping or twisting laterally. The draft bars E are connected, it will be observed, to the draft arms D below and in rear of the axle so that the power applied to propel the machine has a tendency to pull the rear end of the frame downward and to throw its forward end upward. By properly adjusting the point at which the draft is applied to the frame it is possible to secure such a poise or balance of the frame upon the axle that the rakes may readily adapt themselves to undulations in the surface of the ground, thus enabling the machine to rake cleanly without danger of breaking the teeth or rake bars.

For the purpose of elevating the hay a series of longitudinal rake bars G are placed side by side longitudinally over the frame A each bar being provided with a series of downwardly projecting teeth $g$ at short intervals throughout its length, and also provided at the lower end with a forwardly inclined tooth $g'$ intended to pick up the hay from the ground, the rake bars being extended downward and rearward beyond the frame, and to permit the action of the spring teeth as hereinafter described more fully. At the upper end each rake bar is provided with an overlying metal strap H fixed thereto. A bar I is extended across the frame from side to side beneath the strap H and serves to limit the approach of the rake bars toward the slatted surface of the elevator frame in order that the points of their teeth may not come in contact with the frame. There is, however, a considerable space between the top of each rake bar and the under side of this strap H, so that the rake bar is permitted a considerable freedom of movement in a vertical direction, in order that it may rest and float upon the hay passing upward between it and the surface of the underlying frame. The bar I is mounted at its ends in standards $i$ rising rigidly from the frame A, these standards being provided with a transverse vertically adjustable pin $i'$ so that the bar may be caused to hold the rakes at a greater or less elevation over the frame according to the character and quantity of the material being handled. At their lower ends the rake bars rest or float freely on top of the underlying hay. They are reciprocated longitudinally by pitman J, the lower ends of which are carried by a series of cranks on a transverse shaft K, while their upper ends are connected to the respective rake bars by transverse pivots $j$. Under this arrangement the bars are moved to and fro but at the same time are permitted to rise and fall with freedom in order that they may adjust themselves to the varying quantity of hay beneath them, and that their forwardly inclined teeth may ride upward and backward out of the hay as the bars recede. It will be observed that the pitmen J are arranged at a very small angle to the rake bars and that their length and point of connection to the bars is such that they exert but a slight downward thrust or pressure. The shaft K has its successive or alternate cranks projected in diametrically opposite directions so that the alternate bars are moving upward while the intermediate bars are moving downward. This arrangement secures a continuous elevation of the hay as in other elevators using walking rakes.

In order to secure an easy and reliable action of the rakes, it is found advisable to control the motion of their lower ends and also to lift the lower ends positively during the downward or retrograde movement. These results are secured by jointing to each rake bar near the lower end an uprising arm L which is projected loosely through the corresponding pitman J', and provided at the upper end with a roller or projection $l$, so that as the pitman moves upward and rearward to retract the rake it will act through the roller $l$ and arm L to lift the rake bar. The falling motion of the rake bar is limited by extending the arm L through a longitudinal slotted arm M fixed rigidly to a cross bar N, and by providing the arm L with a second roller or pair of rollers $l'$, lying beneath the pitman in position to ride longitudinally upon the arm M as the rake bar is moved forward and upward.

It will be observed that the rollers $l'$ traveling on the arm M serve to sustain the rake bar during its longitudinal movement so as to keep its teeth out of contact with the surface of the underlying frame. As the rollers $l$ and $l'$ are widely separate the lower end of the tooth bar is allowed a considerable latitude of motion upward and downward. When therefore the machine is in action the rake bars have their rear ends lifted and carried rearward a considerable distance beyond the frame and then lowered to or in close proximity to the surface of the ground; and carried forward with a long sweeping stroke so that the teeth $g'$ are enabled to gather up the hay cleanly and carry it forward, so that it will pass upon the frame A and flow continuously upward thereover beneath the rake bars until it is finally discharged at the upper end. In order to prevent downward movement of the hay as the rake bars retreat, the upper surface of the frame A is provided with upwardly inclined teeth O, as shown. These teeth and the teeth of the rake bars may be constructed of spring steel or other material in any suitable form.

Motion may be communicated to the crank shaft K by driving gear of any suitable character, but I prefer to drive the shaft at each end by means of a sprocket wheel P fastened thereon and driven by a chain Q from a wheel R fixed beside the adjacent ground wheel as represented in Figs. 1 and 2. The driving chain is carried beneath the wheel P and sustained in contact therewith by an idler S, this arrangement permitting the crank shaft to be rotated in the reverse direction from that of the ground wheels without the employment of complicated reversing gear.

In order to control to a limited extent the inclination of the elevator frame I prefer to provide it at the lower end on each side, with a spring arm or runner T to act upon the surface of the ground and prevent the lower end from falling so as not to endanger breakage of the rakes. The crank shaft is preferably sustained by brackets U, bolted to the sides of the main frame as shown, and by a cross bar N before mentioned.

In some cases it may be found advisable to employ, in connection with the rake bars already described, rake teeth to assist in gathering up the hay and present it to the action of the rake bars, in such case the teeth may be made of spring wire in curved form like those of an ordinary horse rake and connected to the cross bar N as shown in dotted lines in Fig. 2.

The gathering teeth $g'$ at the lower ends of the rake bars may be of any appropriate form but it is preferred to provide each bar, as shown in Fig. 4 with two teeth lying side by side and sustained in position by a cross piece $g^2$ fixed to the rake bar.

Having thus described my invention, what I claim is—

1. The combination of the inclined frame, the over-lying floating rake bars, the crank shaft, and the pitmen connecting the cranks of said shaft with the respective rake bars.

2. In a hay loader and in combination with the inclined main-frame, the overlying rake-bars, the pitmen and cranks for reciprocating said bars; the arms rising from the rake-bars and provided with rollers or studs and the stationary arms on which said rollers travel to limit the movement of the rake bars toward the underlying frame.

3. In a hay-loader and in combination with the main frame, the overlying reciprocating rake-bars, the pitmen and cranks for moving the same, the arms rising from the rake-bars through the pitmen and provided with projecting rollers or studs above and below the pitmen, and the stationary arms or tracks whereon the lower rollers travel.

4. In a hay loader the combination of the main-frame, the overlying reciprocating rake-bars free to float upon the hay at both ends, independently of each other and the pitmen and cranks connected with the rake bars individually for imparting the reciprocation thereto.

5. In a hay loader the combination of a wheeled main-frame, the overlying floating rake-bars disconnected from each other and provided with gathering teeth at the lower ends, the crank shaft and the pitmen connecting the cranks with the respective rake bars, whereby the gathering teeth are permitted to follow the surface of the ground with a long sweeping stroke.

6. In a hay-loader, the wheeled frame in combination with the overlying rake-bars disconnected from each other and provided with gathering teeth at their lower ends, said rake-bars being capable of movement from and toward the supporting frame independently of each other, cranks and pitmen for reciprocating said bars and allowing their vertical motion, and the supporting tracks or arms whereby the falling motion of the bars is limited to prevent the gathering teeth from engaging in the soil.

In testimony whereof I hereunto set my hand, this 26th day of December, 1891, in the presence of two attesting witnesses.

NORMAN O. HENDERSON.

Witnesses:
NATH. FRENCH,
EFFIE E. MORAN.